United States Patent
Sasaki et al.

(12) 
(10) Patent No.: US 11,208,144 B2
(45) Date of Patent: Dec. 28, 2021

(54) VEHICLE BEHAVIOR STABILIZATION SYSTEM

(71) Applicant: HONDA MOTOR CO., LTD., Tokyo (JP)

(72) Inventors: Hitoshi Sasaki, Wako (JP); Masahiro Hirota, Wako (JP); Takeshi Kojima, Wako (JP); Naoto Okubo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 241 days.

(21) Appl. No.: 16/674,187

(22) Filed: Nov. 5, 2019

(65) Prior Publication Data

US 2020/0140009 A1     May 7, 2020

(30) Foreign Application Priority Data

Nov. 7, 2018   (JP) .............................. JP2018-209489

(51) Int. Cl.
| | |
|---|---|
| *B62D 7/15* | (2006.01) |
| *B60W 10/20* | (2006.01) |
| *B60W 10/06* | (2006.01) |
| *B60T 8/1755* | (2006.01) |

(52) U.S. Cl.
CPC .......... *B62D 7/159* (2013.01); *B60T 8/17555* (2013.01); *B60W 10/06* (2013.01); *B60W 10/20* (2013.01)

(58) Field of Classification Search
CPC .......... B62D 7/159; B62D 6/003; B62D 6/04; B60W 10/20; B60W 10/06; B60W 30/02; B60W 2520/00; B60W 2520/26; B60T 8/17555; B60T 2230/02; B60T 2210/22

See application file for complete search history.

(56) References Cited

U.S. PATENT DOCUMENTS

| | | | | |
|---|---|---|---|---|
| 5,524,079 | A * | 6/1996 | Ishida | ................... B62D 7/159 |
| | | | | 701/42 |
| 5,964,819 | A * | 10/1999 | Naito | ..................... B62D 7/159 |
| | | | | 303/140 |
| 6,209,972 | B1 * | 4/2001 | Matsuno | ............... B60T 8/1755 |
| | | | | 303/140 |
| 8,355,844 | B2 | 1/2013 | Mori et al. | |
| 10,562,502 | B2 * | 2/2020 | Hwang | .............. B60T 8/17551 |
| 2003/0074123 | A1 * | 4/2003 | Kin | ...................... G05D 1/0891 |
| | | | | 701/70 |

(Continued)

FOREIGN PATENT DOCUMENTS

| | | |
|---|---|---|
| JP | 2000085557 A | 3/2000 |
| JP | 2011183865 A | 9/2011 |

*Primary Examiner* — Mary Cheung
(74) *Attorney, Agent, or Firm* — Armstrong Teasdale LLP (57) ABSTRACT

A vehicle behavior stabilization system includes a yaw moment applying device configured to apply a yaw moment to the vehicle, a vehicle behavior stabilization control unit configured to selectively control the yaw moment applying device in such a way to stabilize a vehicle behavior according to a computed rear wheel slip angle in relation to a start threshold value and an end threshold value, and a threshold value correcting unit configured to correct the start threshold value and the end threshold value according to a change rate of the computed rear wheel slip angle and/or a change rate of a computed vehicle body slip angle.

13 Claims, 6 Drawing Sheets

(56) References Cited

U.S. PATENT DOCUMENTS

| | | | |
|---|---|---|---|
| 2006/0025896 A1* | 2/2006 | Traechtler | B60W 10/20 701/1 |
| 2010/0023217 A1* | 1/2010 | Horiuchi | B62D 7/159 701/42 |
| 2013/0144476 A1* | 6/2013 | Pinto | B60T 8/17555 701/22 |

* cited by examiner

VEHICLE BEHAVIOR STABILIZATION SYSTEM

TECHNICAL FIELD

The present invention relates to a vehicle behavior stabilization system.

BACKGROUND ART

In the field of controlling the behavior of a vehicle, it is known to apply a yaw moment to a vehicle body around the gravitational center thereof by controlling the drive torque supplied to the front and the rear wheels of the vehicle via a hydraulically controlled power transmission device, and by controlling the brake force applied to the front and the rear wheels of the vehicle via an electronically controlled brake unit. See JP2011-183865A, for instance. In the previously proposed control system, for the purpose of preventing the uncontrolled spinning of the vehicle, the yaw moment is applied to the vehicle by a feedback control based on the vehicle body slip angle and other state variables of the vehicle. According to this previously proposed control system, different priority levels are assigned to the different state variables so that a stable control action may be ensured even when the accuracy of the vehicle body slip angle is in doubt.

However, the vehicle body slip angle as well as the other state variables may not provide an accurate measure of the stability of the vehicle so that the previously proposed control system may not cause the vehicle to behave as the vehicle operator expects under various conditions. As a result, the vehicle operator may experience some discomfort depending on the operating condition of the vehicle.

It is possible to withhold the yaw moment control until the vehicle starts demonstrating an unstable behavior, but the control system may not be able to stabilize the vehicle quickly enough.

SUMMARY OF THE INVENTION

In view of such a problem of the prior art, a primary object of the present invention is to provide a vehicle behavior stabilization system that allows the vehicle to behave as the vehicle operator expects under normal conditions, but can stabilize the behavior of the vehicle both quickly and reliably once the behavior of the vehicle is likely to become unstable.

To achieve such an object, an embodiment of the present invention provides a vehicle behavior stabilization system (30), comprising: a vehicle body slip angle computing unit (41) configured to compute a vehicle body slip angle ($\beta$) from a steering angle ($\delta f$), a yaw rate ($\gamma$) and a vehicle speed (V); a rear wheel slip angle computing unit (42) configured to compute a rear wheel slip angle ($\beta r$) from the vehicle body slip angle, the yaw rate ($\gamma$) and the vehicle speed (V); a yaw moment applying device (31, 32) configured to apply a yaw moment (M) to the vehicle; a vehicle behavior stabilization control unit (33) configured to selectively control the yaw moment applying device in such a way to stabilize a vehicle behavior according to the rear wheel slip angle in relation to a start threshold value ($\beta rths$) and an end threshold value ($\beta rthe$); and a threshold value correcting unit (47, 48) configured to correct the start threshold value and the end threshold value according to a change rate ($\beta rdot$) of the rear wheel slip angle and/or a change rate ($\beta dot$) of the vehicle body slip angle.

Since the vehicle behavior stabilization control unit selectively controls the yaw moment applying device by comparing the rear wheel slip angle with the start threshold value and the end threshold value, the vehicle is allowed to behave as the vehicle operator expects under critical conditions, and is at the same time prevented from becoming unstable under a wide range of operating conditions. Further, by correcting the start threshold value and the end threshold value for controlling the yaw moment applying device based on the change rate of the vehicle body slip angle or the change rate of the rear wheel slip angle, the vehicle behavior can be stabilized by applying the yaw moment substantially without any time delay.

Preferably, the threshold value correcting unit is configured to lower the start threshold value with an increase in the change rate of the rear wheel slip angle and/or the change rate of the vehicle body slip angle.

Thereby, when the change rate of the vehicle body slip angle or the change rate of the rear wheel slip angle is large, the yaw moment applying device is activated early and deactivated late so that the vehicle behavior can be stabilized in a reliable manner.

Preferably, the vehicle behavior stabilization control unit is configured to determine a yaw moment target value (Mr) by performing a feedback control of the rear wheel slip angle such that the rear wheel slip angle coincides with a target rear wheel slip angle which does not cause a cornering force (CF) of rear wheels (6) to saturate.

Thereby, the rear wheel slip angle can be controlled so that the cornering force does not saturate, and the stability of the vehicle behavior is maintained without regard to the characteristics of the tires. Therefore, the vehicle behavior can be stabilized regardless of the properties of the vehicle and the road surface.

Preferably, the vehicle behavior stabilization control unit is configured to correct a proportional gain (Gp) of the feedback control according to a deviation ($\Delta\beta r$) of the rear wheel slip angle from the target rear wheel slip angle.

The proportional term of the feedback control is varied depending not only on the proportional gain but also on the deviation of the rear wheel slip angle from the target rear wheel slip angle so that the requested yaw moment can be quickly brought to an appropriate value substantially without any time delay.

Preferably, the vehicle behavior stabilization control unit is configured to compute a differential term of the feedback control based on the change rate of the vehicle body slip angle or the change rate of the rear wheel slip angle.

Thereby, the requested yaw moment can be quickly brought to an appropriate value substantially without any time delay.

Preferably, the vehicle behavior stabilization control unit is configured to correct a differential gain (Gd) of the feedback control based on a deviation ($\Delta\beta r$) of the rear wheel slip angle from the target rear wheel slip angle.

Thereby, the requested yaw moment can be even more quickly brought to an appropriate value substantially without any time delay.

Preferably, the vehicle behavior stabilization system further comprises a threshold value computing unit (45, 46) configured to compute the start threshold value and the end threshold value based on a bank angle ($\theta$) of a road surface, a lateral acceleration (Gy), and the vehicle speed (V).

By thus varying the start threshold value and the end threshold value depending on the bank angle of the road surface, the lateral acceleration, and the vehicle speed, a highly accurate behavior control of the vehicle can be achieved.

Preferably, the threshold value computing unit is configured to select the start threshold value and the end threshold value to be smaller when the bank angle of the road surface is large than when the bank angle of the road surface is small.

Thereby, when the vehicle is traveling on a road surface having a large bank angle, and the estimation error of the vehicle body slip angle is therefore likely to be large, the stabilization control of the vehicle behavior by applying the yaw moment is started earlier and finished later. Therefore, the vehicle behavior can be stabilized in a reliable manner.

Preferably, the threshold value computing unit is configured to select the start threshold value and the end threshold value to be larger when the bank angle of the road surface is large than when the bank angle of the road surface is small.

Thereby, when the vehicle is traveling on a road surface having a large bank angle, and the estimation error of the vehicle body slip angle is therefore likely to be large, the stabilization control of the vehicle behavior is prevented from applying the yaw moment in an excessive way.

Preferably, the threshold value computing unit is configured to select the start threshold value and the end threshold value to be smaller when the lateral acceleration is large than when the lateral acceleration is small.

Thereby, when the vehicle is subjected to a large lateral acceleration, and the vehicle is therefore more likely to behave in an unstable manner, the stabilization control of the vehicle behavior by applying the yaw moment is started earlier and finished later. Therefore, the vehicle behavior can be stabilized in a reliable manner.

Preferably, the threshold value computing unit is configured to select the start threshold value and the end threshold value to be larger when the lateral acceleration is large than when the lateral acceleration is small.

Thereby, when the vehicle is subjected to a large lateral acceleration, and the vehicle is therefore more likely to behave in an unstable manner, the stabilization control of the vehicle behavior is prevented from applying the yaw moment in an excessive way.

Preferably, the threshold value computing unit is configured to select the start threshold value and the end threshold value to be smaller when the vehicle speed is high than when the vehicle speed is low.

Thereby, when the vehicle is traveling at a high speed, and the vehicle is therefore more likely to behave in an unstable manner, the stabilization control of the vehicle behavior by applying the yaw moment is started earlier and finished later. Therefore, the vehicle behavior can be stabilized in a reliable manner.

Preferably, the yaw moment applying device is configured to apply the yaw moment to the vehicle by individually controlling a driving force and/or a braking force of wheels (4, 6) of the vehicle.

Thereby, the vehicle is prevented from spinning or otherwise behaving in an unstable manner by applying a yaw moment to the vehicle so that the vehicle is allowed to behave in a stable manner over a wide range of operating conditions.

The present invention thus provides a vehicle behavior stabilization system that allows the vehicle to behave as the vehicle operator expects under normal conditions, but can stabilize the behavior of the vehicle both quickly and reliably once the behavior of the vehicle is likely to become unstable.

DESCRIPTION OF THE PREFERRED EMBODIMENT(S)

A preferred embodiment of the present invention is described in the following with reference to the appended drawings.

Figure 1:
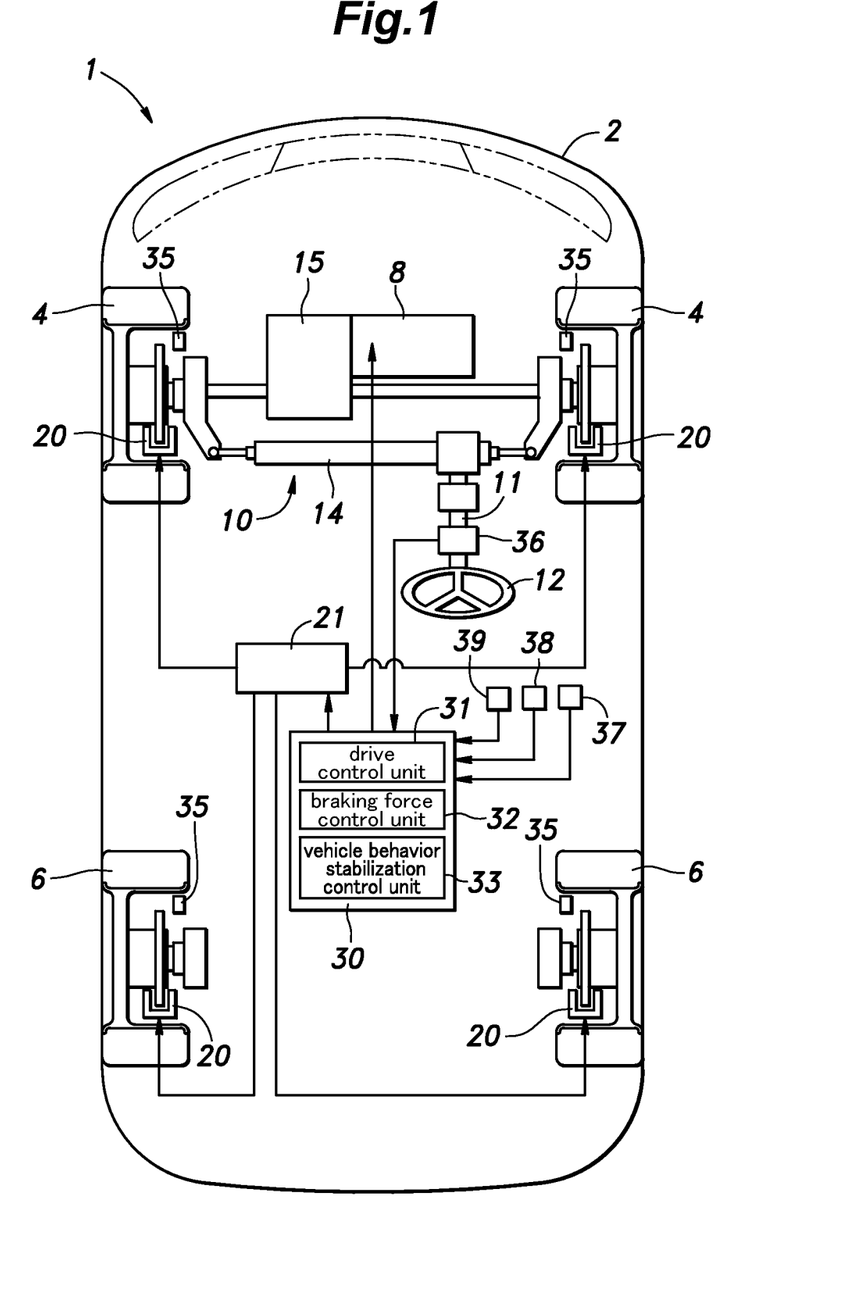
FIG. 1 is a schematic diagram of a vehicle to which a vehicle behavior stabilization system according to an embodiment of the present invention is applied.

FIG. 1 is a schematic diagram of a vehicle 1 to which the present invention is applied. As shown in FIG. 1, the vehicle 1 is a four-wheeled vehicle that includes a pair of front wheels 4 supported by a vehicle body 2 via respective front suspension devices, and a pair of rear wheels 6 supported by the vehicle body 2 via respective rear suspension devices. The vehicle 1 is provided with a power plant 8 that drives the front wheels 4. The power plant 8 may include at least one of an internal combustion engine such as a gasoline engine and a diesel engine, and an electric motor. The vehicle 1 according to the present embodiment is a front wheel drive vehicle in which the drive force of the power plant 8 is transmitted to the front wheels 4, but may also be a four wheel drive vehicle or a rear wheel drive vehicle.

The vehicle 1 is provided with a steering device 10 that includes a steering shaft 11, a steering wheel 12 fixed to an end of the steering shaft 11, and a pinion that is fixed to the other end of the steering shaft 11 and meshes with a rack shaft 14 that is slidably supported by the vehicle body 2. The rack shaft 14 extends laterally, and is connected to the knuckles of the front wheels 4 via tie rods at the respective lateral ends thereof. As the steering wheel 12 connected to the steering shaft 11 is turned, the rack shaft 14 moves laterally causing the front wheels 4 to be steered in the corresponding direction via the respective knuckles. The steering shaft 11 may be provided with an electric motor that applies assist torque in accordance with a steering torque applied by the driver.

The vehicle 1 is provided with a drive force distribution device 15 that variably distributes the drive force of the power plant 8 to the left and right front wheels 4. A yaw moment M for the vehicle 1 is created by applying an uneven drive force to the left and right front wheels 4. The drive force distribution device 15 is configured to distribute the drive force of the power plant 8 to the four wheels 4 and 6 in the case of a four-wheel drive vehicle, and to the left and right rear wheels 6 in the case of a rear wheel drive vehicle.

Each of the front wheels 4 and the rear wheels 6 is provided with a braking force generating device 20. The braking force generating device 20 is, for example, a disk brake, and is controlled by the hydraulic pressure supplied from the hydraulic pressure supply device 21 to apply a braking force to each wheel. The hydraulic pressure supply device 21 can independently control the hydraulic pressure supplied to each braking force generating device 20, and the braking force applied to each wheel can be independently or individually controlled. A yaw moment M acting on the vehicle 1 is thus created by applying an uneven braking force to the front wheels 4 and the rear wheels 6 by the braking force generating device 20, in addition to or instead of distributing drive force to the different wheels by using the drive force distribution device 15.

The braking force generating device 20 may consist of a regenerative brake device that generates a braking force by using a motor that drives each wheel as an electric generator. A retarder which may be either hydraulic or electric may also be used.

The vehicle 1 is provided with a vehicle behavior stabilization system 30. The vehicle behavior stabilization system 30 includes an electronic control circuit (ECU) that includes a microcomputer, ROM, RAM, peripheral circuits, input/output interfaces, various drivers, and the like. The vehicle behavior stabilization system 30 includes a drive force control unit 31, a braking force control unit 32, and a vehicle behavior stabilization control unit 33.

The drive force control unit 31 is configured to control the power plant 8 based on the operation amount or the depression of an accelerator pedal. The braking force control unit 32 computes a braking force that should be generated by each braking force generating device 20 based on the operation amount or the depression of the brake pedal, and controls the hydraulic pressure supply device 21 based on the computed braking force.

The vehicle behavior stabilization control unit 33 computes a requested yaw moment Mr to be applied to the vehicle 1 based on vehicle state variables representing the dynamic state of the vehicle 1, and forwards the computed requested yaw moment Mr to the drive force control unit 31 and to the braking force control unit 32. More specifically, the vehicle behavior stabilization control unit 33 computes a requested yaw moment Mr that is required to prevent the spinning of the vehicle 1 and stabilize the behavior of the vehicle 1 by performing a feedback control based on a rear wheel slip angle βr. Details of the vehicle behavior stabilization control will be discussed later in the disclosure.

The requested yaw moment Mr can be applied to the vehicle 1 by appropriately operating the drive force control unit 31 and the braking force control unit 32.

For example, when the power plant 8 is generating a drive force, the drive force control unit 31 may distribute the drive force between the left and right front wheels 4 to apply a corresponding yaw moment M to the vehicle 1. When the yaw moment M that can be produced by the drive force control unit 31 is insufficient for achieving the requested yaw moment Mr, the braking force control unit 32 may distribute the braking force between the left and right front wheels 4 to apply the requested yaw moment Mr to the vehicle 1 in cooperation with the drive force control unit 31.

When the power plant 8 is not generating a drive force, the drive force control unit 31 may generate a braking force produced by regenerative braking or engine braking, and distribute the braking force between the left and right front wheels 4 unevenly. For instance, the braking force generated by the drive force control unit 31 may be applied to the front wheel 4 on the outer side of the cornering locus of the vehicle 1.

If no braking operation is being taken when generating the requested yaw moment Mr or if the distribution of the braking force is not adequate to produce the request yaw moment Mr, a braking force may be applied to the front wheel 4 on the outer side of the cornering locus of the vehicle 1 while a drive force that is equal to the brake force in absolute value is applied to the front wheel 4 on the inner side of the cornering locust of the vehicle 1. Thereby, the vehicle 1 receives the requested yaw moment Mr without causing any unexpected deceleration of the vehicle 1.

Thus, the drive force control unit 31 and the braking force control unit 32 serve as a yaw moment applying device by suitably activating the drive force distribution device 15 and the braking force generating device 20 so as to apply a desired yaw moment to the vehicle 1. The yaw moment applying device applies a yaw moment M to the vehicle 1 by generating a longitudinal force at any of the wheels 4 and 6, and may include only one of the drive force control unit 31 and the braking force control unit 32.

The vehicle state variables used by the vehicle behavior stabilization control unit 33 for computing the requested yaw moment Mr may include a front wheel steering angle δf, a vehicle speed V, a lateral acceleration Gy of the vehicle 1, an accelerator pedal position PA (pedal depression), and a yaw rate γ of the vehicle 1.

The vehicle body 2 is provided with a vehicle speed sensor 35, a front wheel steering angle sensor 36, a lateral acceleration sensor 37, an accelerator pedal sensor 38, and a yaw rate sensor 39 as sensors for detecting the state variables of the vehicle 1. The vehicle speed sensor 35 may include wheel speed sensors provided on the respective wheels 4 and 6, and each configured to produce a pulse signal corresponding to the rotation of the wheel 4, 6. The front wheel steering angle sensor 36 outputs a signal corresponding to the rotational angle of the steering shaft 11. The lateral acceleration sensor 37 is provided in a central part of the vehicle body, and detects the lateral acceleration Gy of the vehicle 1. The accelerator pedal sensor 38 is configured to detect the angular position of the accelerator pedal (pedal depression). The yaw rate sensor 39 is configured to detect the yaw rate γ of the vehicle 1. The output signals of these sensors are forwarded to the vehicle behavior stabilization system 30.

The vehicle behavior stabilization system 30 acquires the wheel speeds of the wheels 4 and 6 based on the signals from the vehicle speed sensors 35, and computes the vehicle speed V by averaging the detected wheel speeds. The vehicle behavior stabilization system 30 acquires a front wheel steering angle δf based on the signal from the front wheel steering angle sensor 36. The vehicle behavior stabilization system 30 acquires the lateral acceleration Gy of the vehicle 1 based on the signal from the lateral acceleration sensor 37. The vehicle behavior stabilization system 30 acquires the accelerator pedal position PA as the signal from the accelerator pedal sensor 38. The vehicle behavior stabilization system 30 acquires a yaw rate γ of the vehicle 1 from the output signal of the yaw rate sensor 39.

The vehicle body 2 is fitted with a longitudinal acceleration sensor that detects the longitudinal acceleration of the vehicle 1, a roll angle sensor that detects the roll angle of the vehicle body 2 from the strokes of the suspension devices, a roll rate sensor, a brake pedal sensor that detects the position of the brake pedal, and the like. The vehicle behavior stabilization system 30 performs a control action by using the detected values of the longitudinal acceleration, the roll angle, the roll rate, the brake pedal position, and the like that are detected by such sensors.

Figure 2:
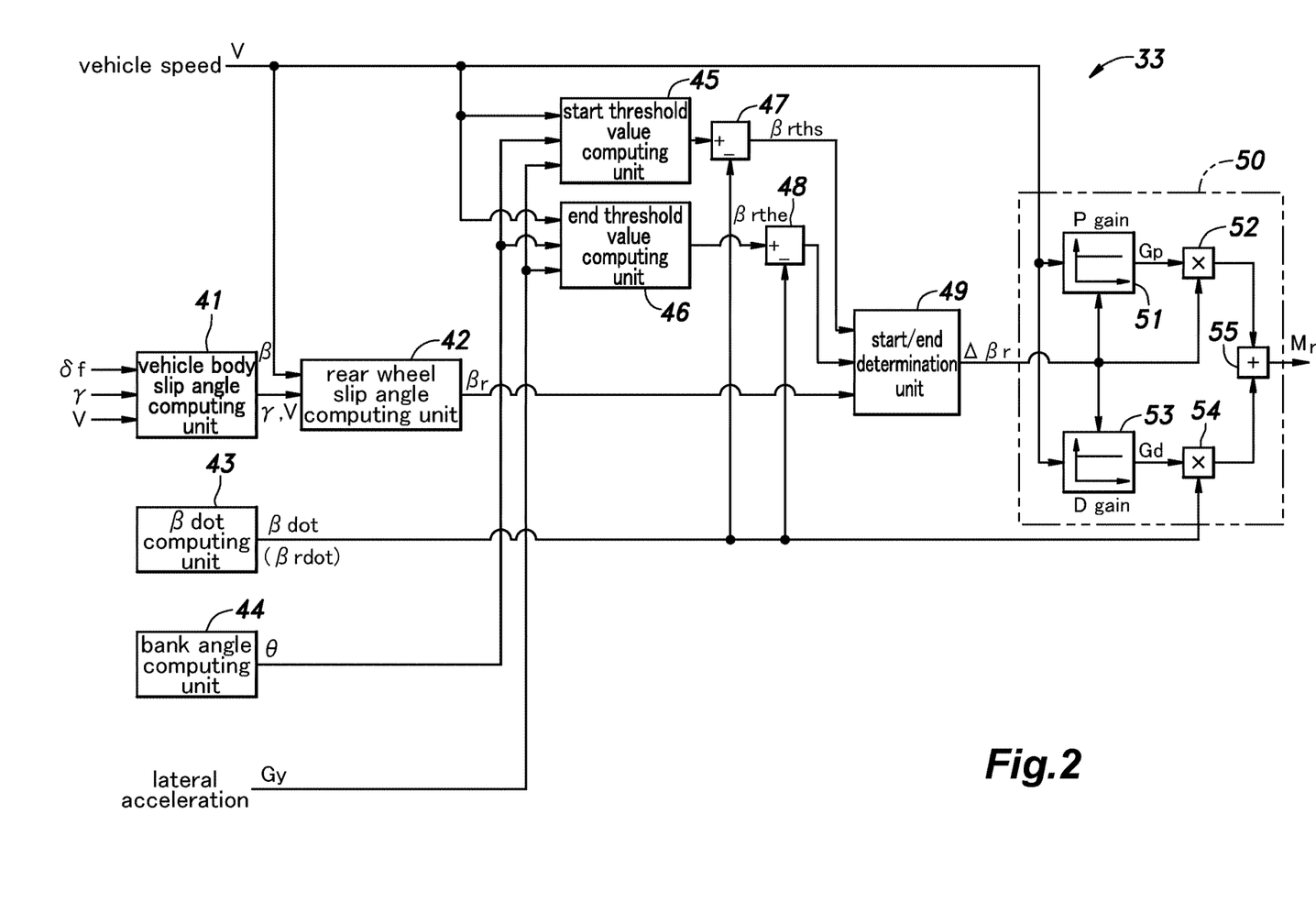
FIG. 2 is a functional block diagram of the vehicle behavior stabilization system.

FIG. 2 is a functional block diagram of the vehicle behavior stabilization control unit 33 shown in FIG. 1. The details of the stabilization control performed by the vehicle behavior stabilization control unit 33 will be described in the following with reference to FIG. 2. First of all, the outline of the stabilization control will be discussed in the following with reference to FIGS. 3 and 4.

Figure 3A:
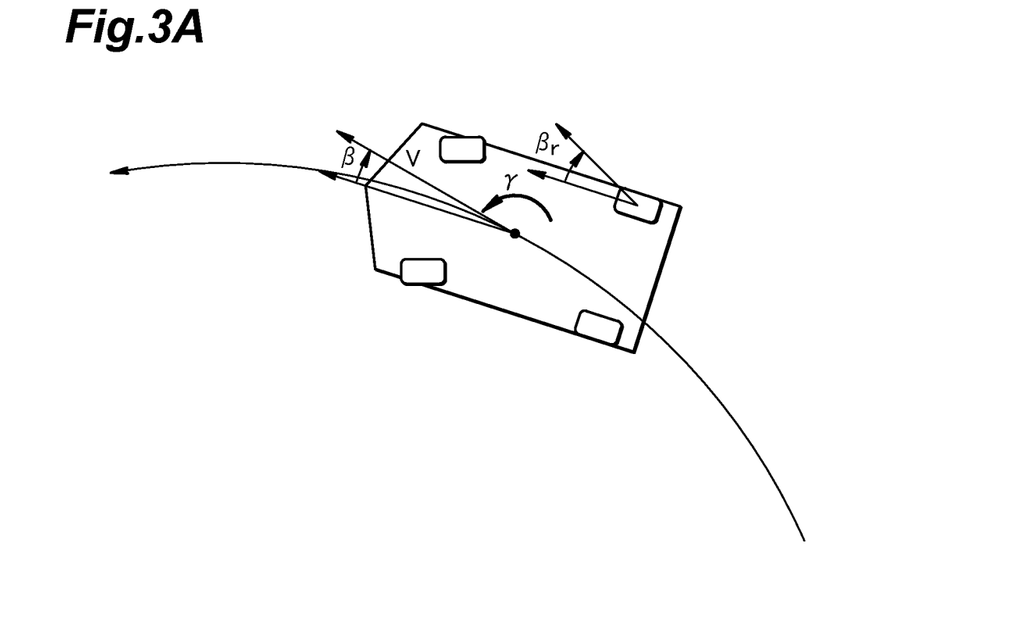
FIG. 3A is a diagram illustrating a behavior of the vehicle when the vehicle body slip angle and the rear wheel slip angle are small.
Figure 3B:
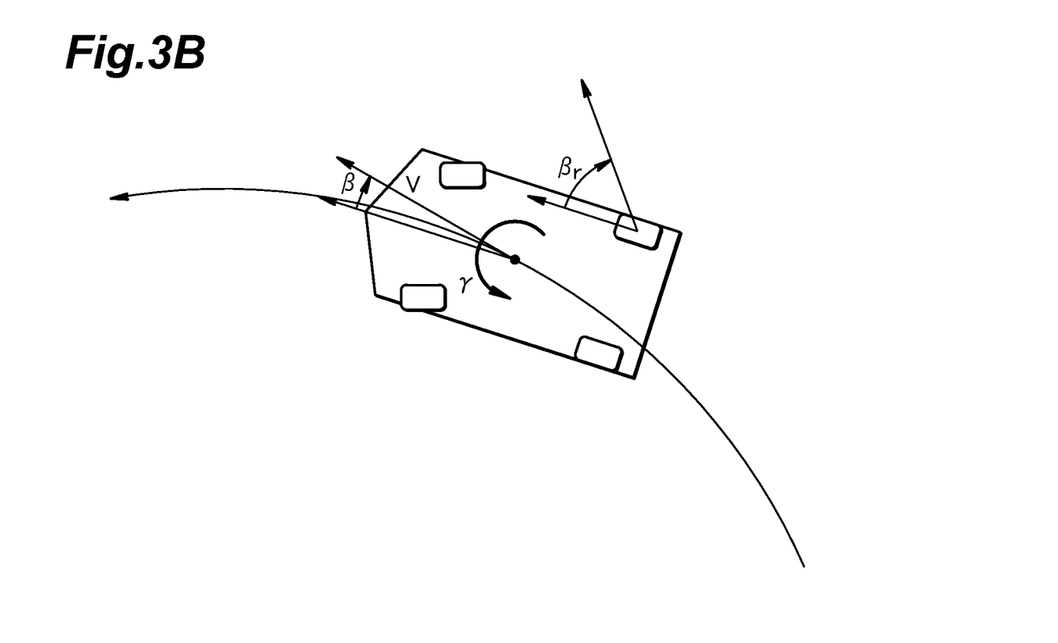
FIG. 3B is a diagram illustrating a behavior of the vehicle when the vehicle body slip angle and the rear wheel slip angle are large.

FIG. 3A shows the behavior of the vehicle 1 when the rear wheel slip angle βr is small, and FIG. 3B shows the behavior of the vehicle 1 when the rear wheel slip angle βr is large. The vehicle 1 is turning left in the both cases, and the vehicle body slip angle β is the same in the both cases. The vehicle body slip angle β is given as the angle of the vehicle body 2 relative to the traveling direction of the gravitational center of the vehicle body 2. As shown in FIG. 3A, when the rear wheel slip angle βr is small, the yaw rate γ is small so that the vehicle 1 is not likely to spin. On the other hand, as shown in FIG. 3B, when the rear wheel slip angle βr is large, the yaw rate γ of the vehicle 1 is higher even though the vehicle body slip angle β is the same so that the vehicle 1 is more likely to spin.

There have been various proposals to stabilize the vehicle behavior by estimating the vehicle body slip angle β, and controlling the behavior of the vehicle according to the estimated vehicle body slip angle β. However, the vehicle body slip angle β does not necessarily indicate the critical condition of the rear wheels 6.

Figure 4:
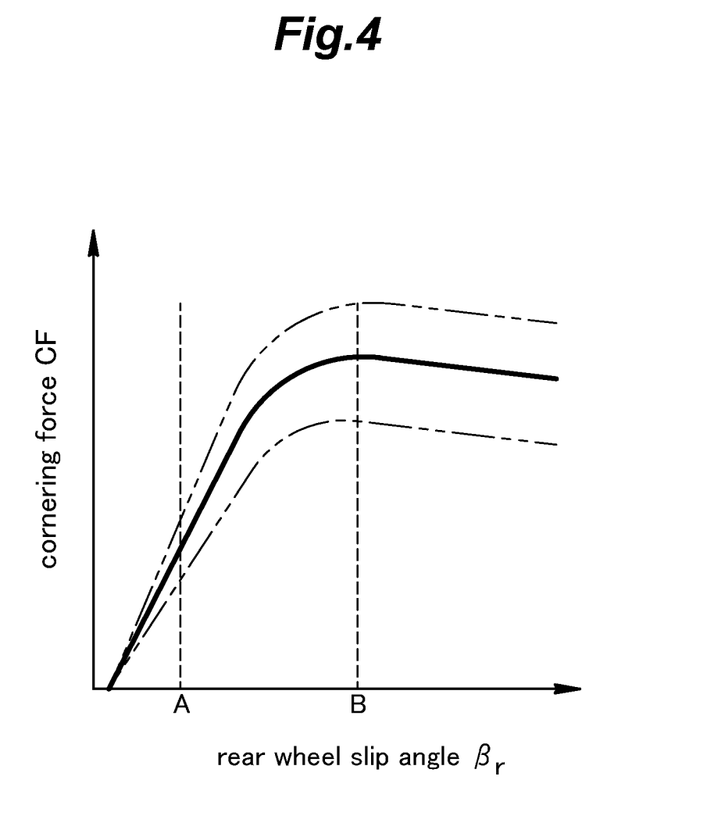
FIG. 4 is a graph showing the relationship between the rear wheel slip angle and the cornering force.

FIG. 4 is a graph showing the relationship between the rear wheel slip angle βr and the cornering force CF. As shown in FIG. 4, the cornering force CF of the rear wheel 6 increases substantially in proportion to the rear wheel slip angle βr when the rear wheel slip angle βr is relatively small. When the rear wheel slip angle βr increases to a certain extent, the cornering force CF saturates, and once this point is reached, the cornering force CF decreases as the rear wheel slip angle βr increases.

When the rear wheel slip angle βr is small as shown in FIG. 3A, the rear wheel slip angle βr is at the position indicated by "A" in FIG. 4, for instance, and the rear wheels 6 exhibits the cornering force CF that corresponds to the cornering power or that increases in proportion to the increase in the rear wheel slip angle βr. In this case, the rear wheel slip angle βr increases with an increase in the cornering force CF so that the lateral load of the vehicle 1 and the cornering force CF can be balanced, and the vehicle behaves in a stable manner.

On the other hand, when the rear wheel slip angle βr is large as shown in FIG. 3B, the rear wheel slip angle βr is at the position indicated by "B" in FIG. 4, for instance, and the cornering force CF saturates, or the cornering force CF does not increase with an increase in the rear wheel slip angle βr. Therefore, the balance between the lateral load of the vehicle 1 and the cornering force CF is lost, and the vehicle 1 spins or otherwise behaves in an unstable manner.

Accordingly, the vehicle behavior stabilization control unit 33 performs a feedback control so as to apply a yaw moment to the vehicle and keep the rear wheel slip angle βr within a predetermined region where the cornering force CF does not saturate.

As shown in FIG. 2, in the vehicle behavior stabilization control unit 33, the vehicle body slide angle β is computed in the vehicle body slip angle computing unit 41. The vehicle body slip angle computing unit 41 computes the vehicle body slip angle β by a per se known method as disclosed in, for example, JP2000-85557A, from the front wheel steering angle δf, the yaw rate γ, the vehicle speed V, and the like. In computing the vehicle body slip angle β, the vehicle body slip angle computing unit 41 may use the lateral acceleration Gy, the slip ratio of the wheels 4 and 6, etc. in addition to the front wheel steering angle δf, the yaw rate γ, and the vehicle speed V.

The vehicle body slip angle β computed by the vehicle body slip angle computing unit 41 is used by the rear wheel slip angle computing unit 42 to compute the rear wheel slip angle βr from the vehicle body slip angle β, the yaw rate γ, and the vehicle speed V by using a per se known method disclosed in, for example, JP2011-183865A. In computing the rear wheel slip angle βr, the rear wheel slip angle computing unit 42 may use other vehicle state variables in addition to the vehicle body slip angle β, the yaw rate γ, and the vehicle speed V.

In the vehicle behavior stabilization control unit 33, the βdot computing unit 43 computes the change rate βdot (change amount per unit time) of the vehicle body slip angle β. The βdot computing unit 43 does not use the vehicle body slip angle β computed by the vehicle body slip angle computing unit 41, but computes the change rate βdot corresponding to the time differential value of the vehicle body slip angle β from the detection values of other sensors such as a yaw rate sensor and a bearing sensor. When the change rate βdot is obtained by differentiating the vehicle body slip angle β, due to the inherent noises in the contained in the computed vehicle body slip angle, the vehicle body slip angle change rate βdot cannot be obtained as a stable and accurate value.

The vehicle behavior stabilization control unit 33 further includes a bank angle computing unit 44 that computes the bank angle θ (lateral gradient) of the road surface. The bank angle computing unit 44 computes the bank angle θ, for example, based on the roll angle of the vehicle body 2 with respect to the road surface detected by the roll angle sensor and the absolute roll angle of the vehicle body 2 estimated from the roll angular velocity detected by the roll angular velocity sensor. The bank angle computing unit 44 may compute the bank angle θ of the road surface also by using the lateral acceleration Gy, the vehicle speed V, the front wheel steering angle δf, and the like.

The bank angle θ computed by the bank angle computing unit 44 and the lateral acceleration Gy detected by the lateral acceleration sensor 37 are used for the computation performed by a start threshold value computing unit 45 and an end threshold value computing unit 46.

The start threshold value computing unit 45 sets a start threshold value βrths that is a threshold value for initiating a yaw moment control. The start threshold value βrths is selected as a value of the rear wheel slip angle that does not cause the cornering force CF to saturate. See FIG. 4. The start threshold value βrths is not a fixed value, but changes in dependence on the vehicle speed V, the bank angle θ and the lateral acceleration Gy. More specifically, the start threshold value βrths decreases in value as the vehicle speed V increases. At higher speeds, the cornering force saturates at smaller rear wheel slip angles βr.

Also, the start threshold value βrths decreases in value as the bank angle θ increases, and the start threshold value βrths decreases in value as the lateral acceleration Gy increases. When the vehicle is traveling on a road surface having a certain bank angle θ, the accuracy in estimating the rear wheel slip angles βr decreases. When the vehicle is cornering and the lateral acceleration Gy is large in value, the vehicle has a higher tendency to behave in an unstable manner. Other factors may also be taken into account when determining the start threshold value βrths.

The end threshold value computing unit 46 sets an end threshold value βrthe that is a threshold value for ending the yaw moment control. The end threshold value βrthe is selected as a value of the rear wheel slip angle that does not cause the cornering force CF to saturate, and to be lower than the start threshold value βrths. The end threshold value βrthe is not a fixed value, but changes in dependence on the vehicle speed V, the bank angle θ and the lateral acceleration Gy. More specifically, the start threshold value βrths decreases in value as the vehicle speed V increases. At higher speeds, the cornering force saturates at smaller rear wheel slip angles βr. The end threshold value βrthe is selected to be smaller than the start threshold value βrths to ensure the stabilization system to operate in a stable manner by thus incorporating a hysteresis in the threshold value.

Similarly, the end threshold value βrthe decreases in value as the bank angle θ increases, and the end threshold value βrthe decreases in value as the lateral acceleration Gy increases for the same reason as for the start threshold value βrths. Again, other factors may also be taken into account when determining the end threshold value βrthe.

The start threshold value βrths computed by the start threshold value computing unit 45 is used for the computation process in the start threshold value correcting unit 47. The start threshold value correcting unit 47 corrects the start threshold value βrths by subtracting a value proportional to the change rate βdot of the vehicle body slip angle β from the start threshold value βrths. Thus, when the rear wheel slip angle βr increases rapidly, the start threshold value βrths is corrected to a lower value so that the stabilization control may be started early. When the rear wheel slip angle βr decreases rapidly, the start threshold value βrths is corrected to a larger value so that the stabilization control may be started late.

The end threshold value βrthe computed by the end threshold value computing unit 46 is used for the computation process in the end threshold value correcting unit 48. The end threshold value correcting unit 48 corrects the end threshold value βrthe by subtracting a value proportional to the change rate βdot of the vehicle body slip angle β from the end threshold value βrthe. Thus, when the rear wheel slip angle βr increases rapidly, the end threshold value βrthe is corrected to a lower value so that the stabilization control may be ended late. When the rear wheel slip angle βr decreases rapidly, the end threshold value βrthe is corrected to a larger value so that the stabilization control may be ended early.

The start threshold value βrths corrected by the start threshold value correcting unit 47 and the end threshold value βrthe corrected by the end threshold value correcting unit 48 are forwarded to a start/end determination unit 49. The start/end determination unit 49 determines the start and end of the stabilization control by comparing the rear wheel slip angle βr computed by the rear wheel slip angle computing unit 42 with the start threshold value βrths and the end threshold value βrthe, respectively. More specifically, the start/end determination unit 49 computes a rear wheel slip angle deviation Δβr by subtracting the start threshold value βrths from the rear wheel slip angle βr from the time point of starting the stabilization control to the time point of ending the stabilization control determination. Thus, the start threshold value βrths is used as the target rear wheel slip angle βrt, and the rear wheel slip angle deviation Δβr is computed as a deviation of the actual rear wheel slip angle βr from the target rear wheel slip angle βrt.

The rear wheel slip angle deviation Δβr computed by the start/end determination unit 49 is forwarded to a requested yaw moment computing unit 50 that computes a requested yaw moment Mr. The requested yaw moment computing unit 50 performs a feedback control of the rear wheel slip angle βr as a PD feedback control based on the rear wheel slip angle deviation Δβr.

In the requested yaw moment computing unit 50, a proportional gain setting unit 51 sets a proportional gain Gp based on the vehicle speed V and the rear wheel slip angle deviation Δβr. More specifically, the proportional gain setting unit 51 refers to a proportional gain map, and looks up the proportional gain Gp corresponding to the vehicle speed V and the rear wheel slip angle deviation Δβr. The obtained proportional gain Gp is used by a proportional gain computing unit 52. The proportional gain computing unit 52 computes the proportional term by multiplying the proportional gain Gp with the rear wheel slip angle deviation Δβr.

In the requested yaw moment computing unit 50, a differential gain setting unit 53 sets a differential gain Gd based on the vehicle speed V and the rear wheel slip angle deviation Δβr. More specifically, the differential gain setting unit 53 refers to a differential gain map, and looks up a differential gain Gd corresponding to the vehicle speed V and the rear wheel slip angle deviation Δβr. The differential gain Gd is used by a differential gain computing unit 54. The differential gain computing unit 54 computes a differential term by multiplying the differential gain Gd with the change rate βdot of the vehicle body slip angle β.

The proportional term computed by the proportional gain computing unit 52 and the differential term computed by the differential gain computing unit 54 are added by an adder 55 to provide the requested yaw moment Mr. The computed requested yaw moment Mr is forwarded to the drive force control unit 31 and the braking force control unit 32.

Thus, the vehicle behavior stabilization control unit 33 performs a feedback control of the rear wheel slip angle βr to provide the requested yaw moment Mr, and the wheels 4 and/or 6 are caused to produce the corresponding longitudinal forces by the drive force distribution device 15 and the braking force generating device 20. As a result, a yaw moment M is applied to the vehicle in such a way to suppress the unstable behavior of the vehicle such as the spinning of the vehicle.

Figure 5:
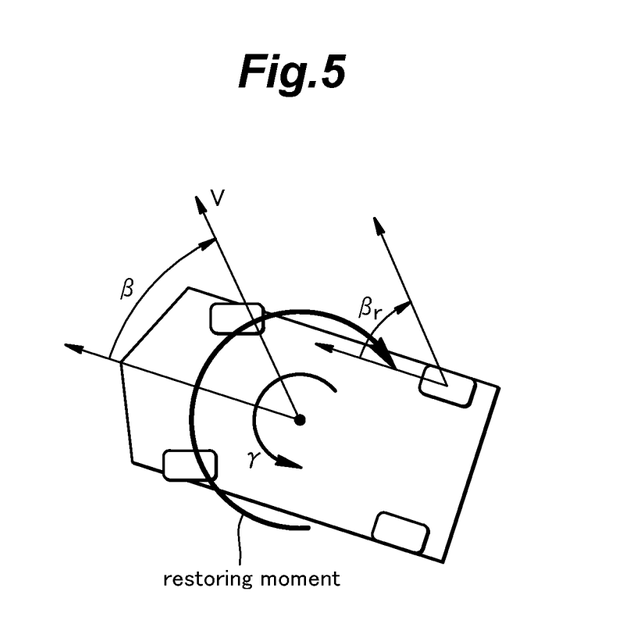
FIG. 5 is a diagram illustrating the mode of operation of the vehicle behavior stabilization system.

FIG. 5 is a diagram illustrating the behavior of the vehicle under the stabilization control according to the embodiment of the present invention. As shown in FIG. 5, when the vehicle behavior stabilization control unit 33 outputs the requested yaw moment Mr, the vehicle 1 is given a yaw moment M (restoring moment) in a direction to suppress the spinning of the vehicle. When the vehicle 1 is about to spin in counterclockwise direction as shown in FIG. 5, a clockwise restoring moment is applied to the vehicle 1.

The requested yaw moment Mr is determined by a feedback control of the rear wheel slip angle βr, or a feedback control using a rear wheel slip angle deviation Δβr which is given as a deviation of the actual rear wheel slip angle βr from the target rear wheel slip angle βrt. The target rear wheel slip angle βrt is set to a value at which the cornering force CF does not saturate. Thereby, the unstable behavior of the vehicle 1 is prevented.

Figure 6:
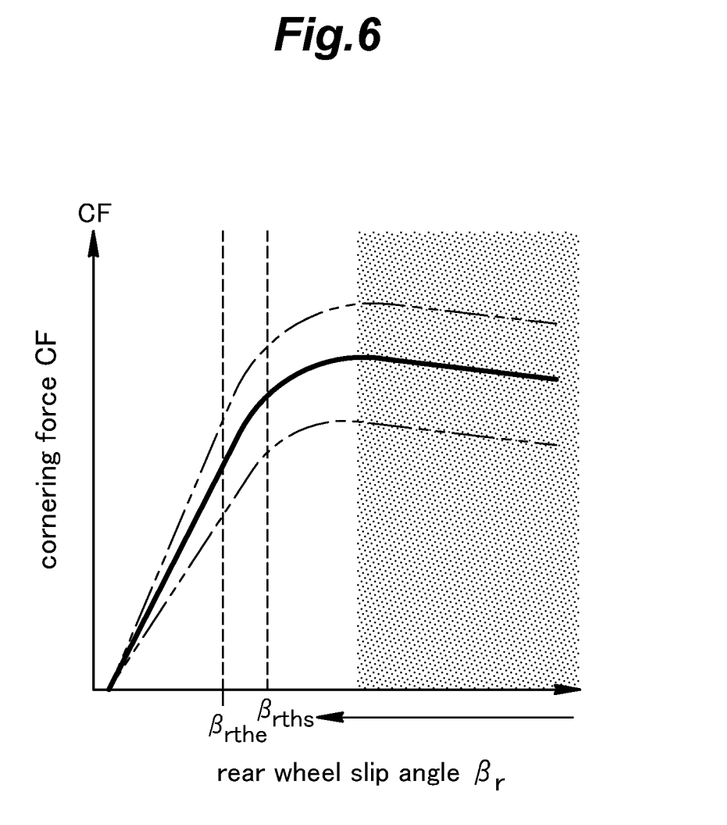
FIG. 6 is a graph similar to that of FIG. 4 illustrating the mode of operation of the vehicle behavior stabilization system.

FIG. 6 is a graph showing the tire characteristics, and is given here for explaining the principle of the stabilization control according to the embodiment. When the cornering force CF saturates, the cornering force CF does not increase with an increase in the rear wheel slip angle $\beta r$ so that the vehicle behavior becomes unstable. On the other hand, when the stabilization control according to the embodiment is performed, the rear wheel slip angle $\beta r$ is prevented from becoming excessive (the shaded region in FIG. 6), and is kept within a region where the cornering force CF does not saturate, owing to the yaw moment M applied to the vehicle 1 so as to counter the tendency of the vehicle to spin. The target rear wheel slip angle $\beta rt$ employed in the feedback control of the rear wheel slip angle $\beta r$ is selected to be well within a region where the cornering force CF does not saturate. As a result, the vehicle behavior is stabilized as discussed earlier with reference to FIG. 4.

The mode of operation of the present embodiment is discussed in the following. As shown in FIG. 2, in the vehicle behavior stabilization system 30 of the present embodiment, the vehicle behavior stabilization control unit 33 selectively controls the yaw moment M by comparing the rear wheel slip angle $\beta r$ with the start threshold value $\beta rths$, and the end threshold value $\beta rthe$ in a direction to stabilize the vehicle behavior. As a result, the driver is enabled to control the vehicle 1 in a comfortable manner. Further, in the vehicle behavior stabilization system 30, the start threshold value correcting unit 47 and the end threshold value correcting unit 48 correct the start threshold value $\beta rths$ and the end threshold value $\beta rthe$, respectively, based on the change rate $\beta dot$ of the vehicle body slip angle $\beta$. Thereby, the yaw moment M is applied in a highly responsive manner so that the behavior of the vehicle can be stabilized substantially without any time lag.

The start threshold value correcting unit 47 and the end threshold value correcting unit 48 correct the start threshold value $\beta rths$ and the end threshold value $\beta rthe$, respectively, to smaller values when the change rate $\beta dot$ of the vehicle body slip angle $\beta$ is large compared to the case where the change rate $\beta dot$ is small. Thereby, when the change rate $\beta dot$ of the vehicle body slip angle $\beta$ is large, the control of the drive force control unit 31 and the braking force control unit 32 starts early and ends late so that the behavior of the vehicle can be stabilized in a reliable manner.

The vehicle behavior stabilization control unit 33 determines the requested yaw moment Mr for the drive force control unit 31 and the braking force control unit 32 by performing the feedback control such that the rear wheel slip angle $\beta r$ coincides with the target rear wheel slip angle $\beta rt$ at which the cornering force CF does not saturate. Therefore, the rear wheel slip angle $\beta r$ is controlled such that the cornering force CF does not saturate, and the stability of the vehicle behavior is maintained. The relationship between the rear wheel slip angle $\beta r$ and the cornering force CF depends on the characteristics of the tires and the road conditions. However, according to the embodiment of the present invention, the vehicle behavior can be stabilized under all conditions.

The vehicle behavior stabilization control unit 33 corrects the proportional gain Gp of the feedback control based on the rear wheel slip angle deviation $\Delta\beta r$. Therefore, the proportional term of the feedback control is based on the deviation from the target rear wheel slip angle $\beta rt$, and the proportional gain is based on the target rear wheel slip angle $\beta rt$. As a result, the requested yaw moment Mr is determined as an appropriate value in a highly responsive manner.

Since the vehicle behavior stabilization control unit 33 computes the differential term of the feedback control based on the change rate $\beta dot$ of the vehicle body slip angle $\beta$, the requested yaw moment Mr reaches an appropriate value at an early stage.

Since the vehicle behavior stabilization control unit 33 corrects the differential gain Gd of the feedback control based on the rear wheel slip angle deviation $\Delta\beta r$, the requested yaw moment Mr reaches an appropriate value at an early stage.

In this embodiment, the start threshold value computing unit 45 and the end threshold value computing unit 46 compute the start threshold value $\beta rths$ and the end threshold value $\beta rthe$, respectively, by taking into account the bank angle $\theta$ of the road surface, the lateral acceleration Gy, and the vehicle speed V. Therefore, the start threshold value $\beta rths$ and the end threshold value $\beta rthe$ are appropriately determined according to the operating condition of the vehicle.

The start threshold value computing unit 45 and the end threshold value computing unit 46 select the start threshold value $\beta rths$ and the end threshold value $\beta rthe$ to be smaller when the bank angle $\theta$ of the road surface is large than when the bank angle $\theta$ of the road surface is small. Thereby, when the vehicle is traveling on a road surface with a large bank angle, and the estimation error of the vehicle body slip angle $\beta$ therefore tends to be large, the stabilization control of the vehicle behavior by applying the yaw moment M is started earlier and finished later. Thereby, the vehicle behavior is stabilized in reliable manner.

The start threshold value computing unit 45 and the end threshold value computing unit 46 select the start threshold value $\beta rths$ and the end threshold value $\beta rthe$ to be smaller when the lateral acceleration Gy is large than when the lateral acceleration Gy is small. Thereby, when the lateral acceleration Gy is large, and the vehicle behavior is therefore more likely to be unstable, the stabilization control of the vehicle behavior by applying the yaw moment M starts earlier and ends later. As a result, the vehicle behavior can be stabilized in a reliable manner over a wide range of operating conditions.

The drive force control unit 31 and the braking force control unit 32 apply the yaw moment M to the vehicle 1 by individually controlling the drive force and braking force of the wheels 4 and 6, respectively. However, it is also possible to use only one of the drive force control unit 31 and the braking force control unit 32 to apply the yaw moment M to the vehicle 1, but it is more advantageous to use both the drive force control unit 31 and the braking force control unit 32 for an effective yaw moment control.

The present invention has been described in terms of a specific embodiment, but is not limited by such an embodiment, and can be modified in various ways without departing from the spirit of the present invention.

For example, in the above embodiment, the start threshold value correcting unit 47 and the end threshold value correcting unit 48 corrected the start threshold value $\beta rths$ and the end threshold value $\beta rthe$, respectively, by using the change rate $\beta dot$ of the vehicle body slip angle $\beta$ computed by the $\beta dot$ computing unit 43. In an alternate embodiment, the vehicle behavior stabilization control unit 33 includes a $\beta rdot$ computing unit that computes a change rate $\beta rdot$ of the rear wheel slip angle $\beta r$. In this case, the start threshold value correcting unit 47 and the end threshold value correcting unit 48 correct the start threshold value $\beta rths$ and the end threshold value $\beta rthe$, respectively, by using the change rate $\beta rdot$ of the rear wheel slip angle $\beta r$. Further, the differential gain computing unit 54 may correct the differential gain Gd by using the change rate $\beta rdot$ of the rear wheel slip angle $\beta r$, instead of the change rate $\beta dot$ of the vehicle body slip angle $\beta$.

Further, it may also be arranged such that the start threshold value computing unit 45 corrects the start threshold value βrths so as to increase as the bank angle θ increases, and the end threshold value computing unit 46 corrects the end threshold value βrthe so as to increase as the bank angle θ increases. By correcting the start threshold value βrths and the base value βreb of the end threshold value βrthe in this way, the vehicle behavior stabilization control unit 33 is prevented from excessively controlling the yaw moment due to the increased inaccuracy of the rear wheel slip angle βr due to the presence of a large bank angle θ.

Further, it may also be arranged such that the start threshold value computing unit 45 corrects the start threshold value βrths so as to increase as the lateral acceleration Gy increases, and the end threshold value computing unit 46 corrects the end threshold value βrthe so as to increase as the lateral acceleration Gy increases. By correcting the start threshold value βrths and the end threshold value βrthe in this way, the vehicle behavior stabilization control unit 33 is prevented from excessively controlling the yaw moment due to the increased inaccuracy of the rear wheel slip angle βr due to the presence of a lateral acceleration Gy or due to the increased tendency of the vehicle to behave in an unstable manner when subjected to a large lateral acceleration.

The invention claimed is:

1. A vehicle behavior stabilization system, comprising:
   a vehicle body slip angle computing unit configured to compute a vehicle body slip angle from a steering angle, a yaw rate and a vehicle speed;
   a rear wheel slip angle computing unit configured to compute a rear wheel slip angle from the vehicle body slip angle, the yaw rate and the vehicle speed;
   a yaw moment applying device configured to apply a yaw moment to the vehicle;
   a vehicle behavior stabilization control unit configured to selectively control the yaw moment applying device in such a way to stabilize a vehicle behavior according to the rear wheel slip angle in relation to a start threshold value and an end threshold value; and
   a threshold value correcting unit configured to correct the start threshold value and the end threshold value according to a change rate of the rear wheel slip angle and/or a change rate of the vehicle body slip angle.

2. The vehicle behavior stabilization system according to claim 1, wherein the threshold value correcting unit is configured to lower the start threshold value with an increase in the change rate of the rear wheel slip angle and/or the change rate of the vehicle body slip angle.

3. The vehicle behavior stabilization system according to claim 1, wherein the vehicle behavior stabilization control unit is configured to determine a yaw moment target value by performing a feedback control of the rear wheel slip angle such that the rear wheel slip angle coincides with a target rear wheel slip angle which does not cause a cornering force of rear wheels to saturate.

4. The vehicle behavior stabilization system according to claim 3, wherein the vehicle behavior stabilization control unit is configured to correct a proportional gain of the feedback control according to a deviation of the rear wheel slip angle from the target rear wheel slip angle.

5. The vehicle behavior stabilization system according to claim 3, wherein the vehicle behavior stabilization control unit is configured to compute a differential term of the feedback control based on the change rate of the vehicle body slip angle or the change rate of the rear wheel slip angle.

6. The vehicle behavior stabilization system according to claim 5, wherein the vehicle behavior stabilization control unit is configured to correct a differential gain of the feedback control based on the deviation of the rear wheel slip angle from the target rear wheel slip angle.

7. The vehicle behavior stabilization system according to claim 1, further comprising a threshold value computing unit configured to compute the start threshold value and the end threshold value based on a bank angle of a road surface, a lateral acceleration, and the vehicle speed.

8. The vehicle behavior stabilization system according to claim 7, wherein the threshold value computing unit is configured to select the start threshold value and the end threshold value to be smaller when the bank angle of the road surface is large than when the bank angle of the road surface is small.

9. The vehicle behavior stabilization system according to claim 7, wherein the threshold value computing unit is configured to select the start threshold value and the end threshold value to be larger when the bank angle of the road surface is large than when the bank angle of the road surface is small.

10. The vehicle behavior stabilization system according to claim 7, wherein the threshold value computing unit is configured to select the start threshold value and the end threshold value to be smaller when the lateral acceleration is large than when the lateral acceleration is small.

11. The vehicle behavior stabilization system according to claim 7, wherein the threshold value computing unit is configured to select the start threshold value and the end threshold value to be larger when the lateral acceleration is large than when the lateral acceleration is small.

12. The vehicle behavior stabilization system according to claim 7, wherein the threshold value computing unit is configured to select the start threshold value and the end threshold value to be smaller when the vehicle speed is high than when the vehicle speed is low.

13. The vehicle behavior stabilization system according to claim 1, wherein the yaw moment applying device is configured to apply the yaw moment to the vehicle by individually controlling a driving force and/or a braking force of wheels of the vehicle.

* * * * *